Oct. 9, 1956 G. A. LYON 2,765,760
METHOD OF PRESS-FORMING AND CUTTING ARTICLES FROM STRIP
Filed Dec. 27, 1951
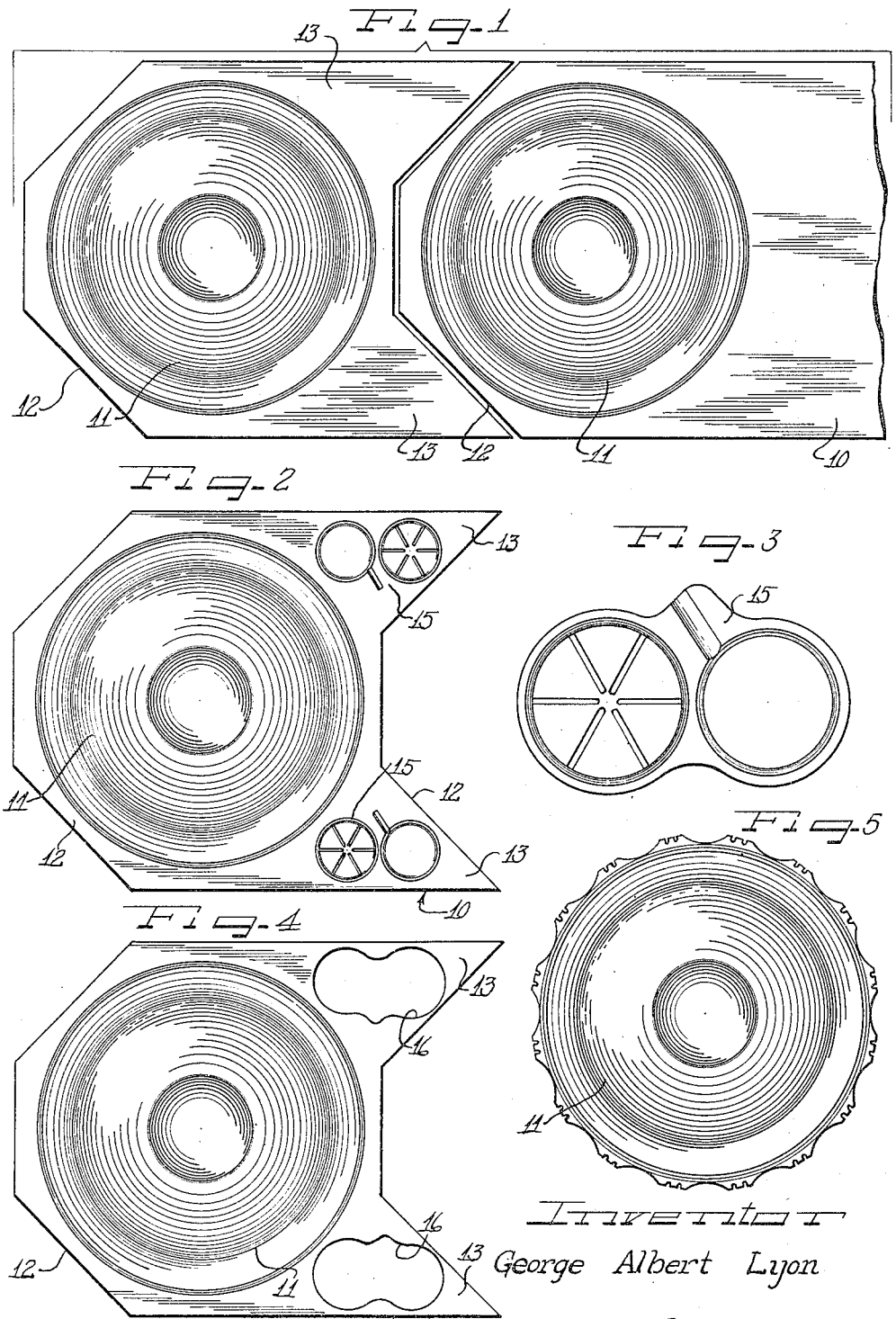
Inventor
George Albert Lyon United States Patent Office 2,765,760
Patented Oct. 9, 1956

2,765,760

METHOD OF PRESS-FORMING AND CUTTING ARTICLES FROM STRIP

George Albert Lyon, Detroit, Mich.

Application December 27, 1951, Serial No. 263,660

3 Claims. (Cl. 113—51)

This invention relates to a method of forming metal articles from strip stock and more particularly to a method wherein as each forward formed portion is cut from the strip of stock, tail portions are provided from which other articles can be formed and can be used as manual gripping ends for feeding the forward portion into a final forming or cutting station.

It is an object of this invention to provide an improved method of forming articles successively from an advancing end of a continuous strip in such manner that what would otherwise be wasted material can be used not only to provide additional articles, but also as a means of manipulating the cut-off portion in a final forming or shearing operation.

In accordance with the general features of this invention there is provided in a method of forming articles stamped from continuous metal strip, the steps of moving the strip into a forming station, forming a circular article in the forward end of the strip, advancing the strip to move the formed article out of said station and to position an adjoining portion and contemporaneously cutting off the previously removed end of the strip along an irregular line transversely of said strip with divergent end portions extending toward the article then being formed, thereby providing the cut-off end at two of its corners with spaced tail portions, inserting said tail portions in another press station to form other articles therein, shearing said other articles from said tail portions and then gripping said tail portions to feed said end into a blanking station to shear therefrom said circular article previously formed therein.

Another feature of the invention relates to continuously repeating the foregoing operations as the forward end portions are successively cut from the continuous strip.

Other objects and features of this invention will more fully appear from the following detailed description taken in connection with the accompanying drawings which illustrate diagrammatically how my method may be practiced and wherein:

Figure 1 is a plan view of a strip of stock showing the irregular transverse line of cut for separating the foremost formed article from the immediately following formed portion;

Figure 2 is a view of the cut off end portion of Figure 1 showing how additional articles can be pressed into the tail or waste ends of the cut off portion;

Figure 3 is a plan view of one of the articles after it has been sheared from the tail portion;

Figure 4 shows the condition of the cut off end portion after the shearing of the articles from the tail portions; and Figure 5 is a plan view of a circular article formed from the principal stamping in the cut off end portion of Figure 4.

As shown on the drawings:

The reference character 10 designates generally a continuous strip of stock such, for example, as steel coil stock. The forward end of this stock is adapted to be fed into a press forming station at which a circular object such as a wheel disc 11 may be blanked in the forward end portion without severing the blank from the strip.

Thereafter the strip is advanced to remove the formed article from the press station and to position the adjoining portion of the strip from which a duplicate article 11 may be formed. At the same time that this forming takes place the strip is cut transversely along a line other than straight such as the irregular line of cut 12. This line of cut is such that the previously formed article which has been removed from the station is provided with divergent end or tail portions 13—13 which extend toward the forming station.

The cut end portion of the strip is then removed to another station where other articles 15—15 are formed in said tail portions. Upon the subsequent shearing or blanking operation such articles 15 are cut from the tail portions 13 leaving the openings 16—16 (Fig. 4).

Since the tail portions are not severed or completely destroyed in the formation of these additional articles 15—15, such tail portions can be used as manual gripping means for feeding the cut portion of the strip into a shearing station in which the formed article or disc 11 can be cut from the stock. This cut article 11, as shown in Fig. 5, may thereafter be given additional forming operations to make it into a wheel cover or the like.

It should also be borne in mind that during the forming of the additional articles 15—15, as shown in Fig. 2, the main portion of the cut off end of the stock can be gripped by the operator to feed the tail portions 13—13 into a press station.

It will be appreciated that the foregoing operations may be continuously repeated as the forward end portions are successively cut from the strip 10 until the strip has been completely used up.

I claim as my invention:

1. In a method of forming articles from a continuous strip, performing the following steps in the order in which they are recited: blank forming a first impression of a first article in a first portion of said strip, feeding said strip forwardly for a distance greater than the longitudinal dimension of the first article, blank forming a second impression of said first article in a succeeding portion of said strip and contemporaneously cutting said first portion of said strip from said succeeding portion along a line having terminal segments thereof extending generally in the direction of said second impression from said first impression to provide divergent tail portions to said first portion of said strip, and successively forming other articles in said tail portions, removing said other articles from said tail portions without removing the tail portions from said first portion thereby leaving said tail portions thereon as a gripping and handling means therefor, and removing said blank formed first article from said first portion of said strip.

2. In the method of forming metal articles from a continuous metal strip, performing the following steps in the order in which they are recited: blank forming a first impression of a first article in a first portion of said metal strip, feeding said strip forwardly for a distance greater than the longitudinal dimension of said first article, blank forming a second impression of said first article in a succeeding portion of said strip and contemporaneously cutting said first portion of said strip from said succeeding portion along a line having sections thereof extending generally in the direction of said succeeding portion from said first portion to provide a pair of divergent tail portions to said first portion of said strip, and successively forming other metal articles in said tail portion, removing said other articles from said tail portions without removing the tail portions from said first portion thereby leaving said tail portions thereon as a gripping and handling means therefor, and thereafter removing said blank formed first metal article from said first portion of said strip while utilizing said tail portions as handles for said first portion.

3. A method of forming metal articles from a continuous metal strip comprising performing the following steps in the order in which they are recited: successively forming first articles contiguously along a metal strip and contemporaneously with forming individual of said first articles cutting from said strip an immediately preceding portion of said strip along a line having angularly divergent end segments whereby each successive portion of said strip is provided with ear-like sections, forming second articles in said ear-like sections, removing said second articles from said ear-like sections without removing said ear-like sections from said portion of said strip thereby leaving said ear-like sections thereon as gripping and handling means therefor, and removing said first article from the portion of the strip carrying the same while utilizing said ear-like sections as handles for the portion of the strip.

References Cited in the file of this patent

UNITED STATES PATENTS

| | | |
|---|---|---|
| 413,667 | Hodgson | Oct. 29, 1889 |
| 413,668 | Hodgson | Oct. 29, 1889 |
| 663,980 | Parker | Dec. 18, 1900 |
| 1,932,407 | Hothersall | Oct. 31, 1933 |
| 1,956,348 | Goodwin | Apr. 24, 1934 |
| 1,992,962 | Murch | Mar. 5, 1935 |
| 2,307,335 | Reddick | Jan. 5, 1943 |
| 2,343,253 | Clark | Mar. 7, 1944 |
| 2,597,010 | Lyon | May 20, 1952 |